United States Patent [19]

Laurent et al.

[11] Patent Number: 4,759,932

[45] Date of Patent: Jul. 26, 1988

[54] METHOD OF REDUCING HEAT STRESS IN ANIMALS

[75] Inventors: Sebastian M. Laurent, Greenwell Springs; Robert N. Sanders, Baton Rouge, both of La.

[73] Assignee: Ethyl Corporation, Richmond, Va.

[21] Appl. No.: 934,457

[22] Filed: Nov. 24, 1986

Related U.S. Application Data

[60] Continuation-in-part of Ser. No. 846,188, Mar. 31, 1986, abandoned, which is a continuation of Ser. No. 741,572, Jun. 5, 1985, abandoned, which is a division of Ser. No. 475,370, Mar. 14, 1983, Pat. No. 4,556,564.

[51] Int. Cl.$^4$ ................................................ A23K 1/00
[52] U.S. Cl. .......................................... 426/2; 426/74; 426/623; 426/630; 426/636; 426/805; 426/807
[58] Field of Search ................ 426/2, 72, 73, 74, 623, 426/630, 805, 807, 636

[56] References Cited

U.S. PATENT DOCUMENTS

| | | | |
|---|---|---|---|
| 3,836,676 | 9/1974 | Komakine | 426/74 |
| 4,515,780 | 5/1985 | Laurent et al. | 424/154 |
| 4,556,564 | 12/1985 | Laurent et al. | 426/2 |
| 4,600,586 | 7/1986 | Green | 426/74 |
| 4,610,882 | 9/1986 | Laurent et al. | 426/74 |
| 4,610,883 | 9/1986 | Laurent et al. | 426/74 |

FOREIGN PATENT DOCUMENTS

| | | |
|---|---|---|
| 939186 | 1/1974 | Canada . |
| 0224856 | 6/1987 | European Pat. Off. . |
| 59-203450 | 11/1984 | Japan . |
| 1078492 | 4/1986 | Japan .................................. 426/74 |

OTHER PUBLICATIONS

Scientific Research, "Sometimes Im Sorry I Invented It", Scientific Research Jan. 20, 1969, p. 15.
Nakaue, "Studies with Clinoptilolite in Poultry", Poultry Science 1981, vol. 60, pp. 944–949.
Willis et al., Evaluation of Zeolites Fed to Male Broiler Chickens, Poultry Science Mar. 1982, vol. 61, pp. 438–442.
Vest et al., "Influence of Feeding Zeolites to Poultry Under Field Conditions" Extension Poultry Science Dept. U of George Abstract.
Ingram et al., *Influence of Ethacal® Feed Component on Production Parameters of White Leghorn Hens During High Temperatures* disclosed on or about Jan. 27, 1987, at the Southern Poultry Science Society Symposium, Atlanta, Georgia.
Mumpton et al., The Appln. of Natural Zeolites in Animal Sci. & Aquaculture, *Journal of Animal Science* 45, No. 5, 1188–1203 (1977).
Chung et al., *Nongsa Sihom Youngu Pogo*, 1978, 20 (Livestock), pp. 77–83.
Reagan, Luther M., *Effects of Adding Zeolites to the Diets of Broiler Cockerels;* Thesis Recommended for Acceptance 4/25/84; Colorado State University.
Nolen et al., *Food & Cosmetic Toxicology*, 21, (5), p. 697 (1983).
Carlisle, Nutrition Reviews, 40(7), pp. 193–198 (1982).
Carlisle, Chap. Four of Silicon & Siliceous Structures in Biol. Systems, Simpson, T. L., ed. B. E. Spriner Verlag, N.Y. (1981), pp. 69–94.
Edwards, *Poultry Science*, vol. 65, Supp. No. 1 (1986).
Roland et al., *Poultry Science* 64 1177–87 (1985).
Miles et al., *Nutrition Reports International* 34, No. 6, 1097–1103 (Dec., 1986).
Hatieganu et al., *Buletinul Institului Agronomic Cluj–Napoca*, Zootehnie si Medicina 33, 27–34 (1979).

*Primary Examiner*—R. B. Penland

[57] ABSTRACT

A method of reducing heat stress in animals, especially poultry, wherein a small amount of zeolite is added to the animal feed and the feed is regularly fed to the animals during periods of heat stress causing temperatures.

22 Claims, No Drawings

METHOD OF REDUCING HEAT STRESS IN ANIMALS

CROSS-REFERENCE TO RELATED APPLICATIONS

This is a continuation-in-part of application Ser. No. 846,188 filed on Mar. 31, 1986, which is a continuation of application Ser. No. 741,572 filed on June 5, 1985, now abandoned, which in turn is a division of application Ser. No. 475,370 filed on Mar. 14, 1983, now U.S. Pat. No. 4,556,564.

BACKGROUND OF THE INVENTION

The present invention is in the general field of animal farming, especially poultry farming and relates particularly to controlled feeding of animals to improve their resistance to heat stress.

The demand for meat and eggs, including poultry and poultry eggs, especially chickens and chicken eggs has expanded considerably over the last decade. The poultry industry has grown from a home industry to a large scale manufacturing industry in which thousands of chickens and tens of thousands of eggs are produced daily at single poultry farms or egg laying installations. Some eggs are produced for eating and some eggs are produced for hatching. One problem with such large scale egg producing in high summer temperatures. Animals are highly susceptible to heat stress. Poultry laying hens are particularly vulnerable. As temperatures rise egg production decreases significantly.

Hens under heat stress not only produce fewer eggs and poorer quality eggs, but suffer a high mortality rate.

Extremely high temperatures and high temperature-high humidity conditions can have a devastating effect on the animal kingdom. Animals such as poultry, swine and canines, in particular, suffer because they have no sweat glands to provide cooling relief. Other animals that do have sweating capabilities suffer when high humidity conditions prevent adequate evaporation rates to allow sweating to be effective.

In modern production facilities for animal production of meat, milk and eggs the animals are kept largely in confinement and must be provided the proper environment for control of their body temperatures. These environments may become uncontrollable when there are severe heat waves.

With poultry, relatively short periods of time at temperatures above about 94° F. will cause the temperature control mechanism in the body to malfunction and lead to brain damage and subsequent death. In the case of swine, confined management systems usually have thermostatically controlled sprinkling systems to wet the hogs to provide evaporative cooling when temperatures exceed 85° F.; this need for cooling is commonly identified with age old associations of hogs and water holes. The panting of dogs during hot weather is their attempt to move as much air through their lungs for heat exchange and cooling.

We have found that the inclusion of zeolite, especially zeolite A in the diets of animals will help them endure or resist the ill effects that are associated with excessive heat conditions. Laboratory studies with laying hens indicated that zeolite A will result in improved performance when included in their diets as measured by reduced mortality, maintenance of egg weight, egg production rate, eggshell quality, and body weight.

It is therefore the primary object of the present invention to provide a diet for animals which effectively reduces heat stress in the animals.

It is an especially important object of the present invention to provide a diet for poultry which substantially reduces heat stress in the poultry.

It is another important object of the present invention to provide a means for inhibiting or effectively reducing heat stress in animals by adding a small amount of zeolite A to the diet of the animals regularly fed to the animals during high temperatures without any deleterious effect on the food value of the animals or animal products.

We have previously discovered that the strength of poultry eggs can be substantially enhanced by adding a small amount of zeolite A to the diet of the laying poultry.

In addition to increasing eggshell strength in laying hens as described in our U.S. Pat. No. 4,556,564, improving feed utilization efficiency in poultry and larger egg size as described in our U.S. Pat. No. 4,610,882, decreasing the mortality rate of poultry as described in our U.S. Pat. No. 4,610,883, and increasing the bone strength of animals, including humans, as set forth in our copending U.S. application Ser. No. 801,596, as a result of our continuing studies it has been discovered that the regular feeding of small amounts of zeolite A to poultry produces the following positive results:

1. Calmer birds, reduced activity (layers)
2. Extended lay cycle duration (layers and broiler breeders)
3. Reduced condemnation (broilers)
4. Improved feathering (broilers)

The advantages of larger eggs, extended lay cycles and reduced condemnations are self-evident. Calmer birds produce more, less deformed eggs and lay with greater regularity. Stress is a highly negative factor among laying hens. Improved feathering correlates with healthier and stronger birds.

More recently, our studies have discovered the following positive results:

1. Improved resistance to heat stress, a multifaceted benefit
2. Improved lean/fat ratio in the edible carcass Poultry are highly subject to heat stress. As temperatures rise, egg production decreases significantly, birds eat less feed, their body temperatures rise, they lose body weight, they lay smaller eggs of poorer shell quality, and they incur higher mortality rates. Birds regularly fed zeolite A are dramatically less susceptible to heat stress.

With the increased desirability of less fat in a human diet, it has become more and more important that the meat of poultry raised for food have a high lean content and a low fat content.

Zeolites are crystalline, hydrated aluminosilicates of alkali and alkaline earth cations, having infinite, three-dimensional structures.

Zeolites consist basically of a three-dimensional framework of $SiO_4$ and $AlO_4$ tetrahedra. The tetrahedra are crosslinked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion in the crystal of a cation, for example, a sodium ion. This balance may be expressed by the formula $Al/Na=1$. The spaces between the tetrahedra are occupied by water molecules prior to dehydration.

Zeolite A may be distinguished from other zeolites and silicates on the basis of their composition and X-ray powder diffraction patterns and certain physical characteristics. The X-ray patterns for these zeolites are described below. The composition and density are among the characteristics which have been found to be important in identifying these zeolites.

The basic formula for all crystalline sodium zeolites may be represented as follows:

$$Na_2O.Al_2O_3.xSiO_2.yH_2O$$

In general, a particular crystalline zeolite will have values for "x" and "y" that fall in a definite range. The value "x" for a particular zeolite will vary somewhat since the aluminum atoms and the silicon atoms occupy essentially equivalent positions in the lattice. Minor variations in the relative number of these atoms do not significantly alter the crystal structure or physical properties of the zeolite. For zeolite A, the "x" value normally falls within the range 1.85±0.5.

The value for "y" is not necessarily an invariant for all samples of zeolites. This is true because various exchangeable ions are of different size, and, since there is no major change in the crystal lattice dimensions upon ion exchange, the space available in the pores of the zeolite to accommodate water molecules varies.

The average value for "y" for zeolite A is 5.1. The formula for zeolite A may be written as follows:

$$1.0\pm0.2Na_2O.Al_2O_3.1.85\pm0.5SiO_2.yH_2O$$

In the formula, "y" may be any value up to 6.

An ideal zeolite A has the following formula:

$$(NaAlSiO_4)_{12}.27H_2O$$

Among the ways of identifying zeolites and distinguishing them from other zeolites and other crystalline substances, the X-ray powder diffraction pattern has been found to be a useful tool. In obtaining the X-ray powder diffraction patterns, standard techniques are employed. The radiation is the Kα doublet of copper and a Geiger counter spectrometer or a suitable radiation detector with a strip chart pen recorder is used. The peak heights, I, and the positions as a function of 2θ where θ is the Bragg angle, are read from a spectrometer chart or accumulated in computer memory. From these, the relative intensities, 100 I/I$_o$, where I$_o$ is the intensity of the strongest line or peak and d the interplanar spacing in angstroms corresponding to the recorded lines are calculated.

X-ray powder diffraction data for a sodium zeolite A are given in Table I.

TABLE I

| X-RAY DIFFRACTION PATTERN FOR ZEOLITE A | | |
|---|---|---|
| $h^2 + k^2 + l^2$ | d (Å) | 100 I / I$_o$ |
| 1 | 12.29 | 100 |
| 2 | 8.71 | 70 |
| 3 | 7.11 | 35 |
| 4 | 6.15 | 2 |
| 5 | 5.51 | 25 |
| 6 | 5.03 | 2 |
| 8 | 4.36 | 6 |
| 9 | 4.107 | 35 |
| 10 | 3.895 | 2 |

TABLE I-continued

| X-RAY DIFFRACTION PATTERN FOR ZEOLITE A | | |
|---|---|---|
| $h^2 + k^2 + l^2$ | d (Å) | 100 I / I$_o$ |
| 11 | 3.714 | 50 |
| 13 | 3.417 | 16 |
| 14 | 3.293 | 45 |
| 16 | 3.078 | 2 |
| 17 | 2.987 | 55 |
| 18 | 2.904 | 10 |
| 20 | 2.754 | 12 |
| 21 | 2.688 | 4 |
| 22 | 2.626 | 20 |
| 24 | 2.515 | 6 |
| 25 | 2.464 | 4 |
| 26 | 2.414 | >1 |
| 27 | 2.371 | 3 |
| 29 | 2.289 | 1 |
| 30 | 2.249 | 3 |
| 32 | 2.177 | 7 |
| 33 | 2.144 | 10 |
| 34 | 2.113 | 3 |
| 35 | 2.083 | 4 |
| 36 | 2.053 | 9 |
| 41 | 1.924 | 7 |
| 42 | 1.901 | 4 |
| 44 | 2.858 | 2 |
| 45 | 1.837 | 3 |
| 49 | 1.759 | 2 |
| 50 | 1.743 | 13 |
| 53 | 1.692 | 6 |
| 54 | 1.676 | 2 |
| 55 | 1.661 | 2 |
| 57 | 1.632 | 4 |
| 59 | 1.604 | 6 |

The more significant d values for zeolite A are given in Table III.

TABLE II

| MOST SIGNIFICANT d VALUES FOR ZEOLITE A |
|---|
| d Value of Reflection in Å |
| 12.2 ± 0.2 |
| 8.7 ± 0.2 |
| 7.10 ± 0.15 |
| 5.50 ± 0.10 |
| 4.10 ± 0.10 |
| 3.70 ± 0.07 |
| 3.40 ± 0.06 |
| 3.29 ± 0.05 |
| 2.98 ± 0.05 |
| 2.62 ± 0.05 |

Occasionally, additional lines not belonging to the pattern for the zeolite appear in a pattern along with the X-ray lines characteristic of that zeolite. This is an indication that one or more additional crystalline materials are mixed with the zeolite in the sample being tested. Small changes in line positions may also occur under these conditions. Such changes in no way hinder the identification of the X-ray patterns as belonging to the zeolite.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for a zeolite, are not to exclude those materials which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simpler test described in "American Mineralogist," Vol. 28, page 545, 1943, permits a quick check of the silicon to aluminum ratio of the zeolite. According to the description of the test, zeolite minerals with a three-dimensional network that contains aluminum and silicon atoms in an atomic ratio of $Al/Si = \frac{2}{3} = 0.67$, or greater, produce a gel when treated with hydrochloric acid. Zeolites having smaller aluminum to silicon ratios disintegrate in the presence of hydrochloric acid and precipitate silica. These tests were developed with natural zeolites and may vary slightly when applied to synthetic types.

U.S. Pat. No. 2,882,243 describes a process for making zeolite A comprising preparing a sodium-aluminum-silicate water mixture having an $SiO_2:Al_2O_3$ mole ratio of from 0.5:1 to 1.5:1, and $Na_2O/SiO_2$ mole ratio of from 0.8:1 to 3:1, and an $H_2O/Na_2O$ mole ratio of from 35:1 to 200:1, maintaining the mixture at a temperature of from 20° C. to 175° C. until zeolite A is formed, and separating the zeolite A from the mother liquor.

Experiments have been in progress in Japan since 1965 on the use of natural zeolite minerals as dietary supplements for poultry, swine and cattle. Significant increases in body weight per unit of feed consumed and in the general health of the animals was reported (Minato, Hideo, Koatsugasu 5:536, 1968). Reductions in malodor were also noted.

Using clinoptilolite and mordenite from northern Japan, Onagi, T. (Rept. Yamagata Stock Raising Inst. 7, 1966) found that Leghorn chickens required less food and water and gained as much weight in a two-week trail as birds receiving a control diet. No adverse effects on health or mortality were noted. The foregoing Japanese experiments were reported by F. A. Mumpton and P. H. Fishman in the *Journal of Animal Science*, Vol. 45, No. 5 (1977) pp. 1188-1203.

U.S. Pat. No. 3,836,676 issued to Chukei Komakine in 1974 discloses the use of zeolites as adsorbent moisture of ferrous sulfate crystals in an odorless chicken feed comprising such crystals and chicken droppings. The results were said to be no less than those in the case where chickens were raised with ordinary feed.

Canadian Pat. No. 939,186 issued to White et al in 1974 discloses the use of zeolites having exchangeable cations as a feed component in the feeding of urea or biuret non-protein (NPR) compounds to ruminants, such as cattle, sheep and goats. Natural and synthetic as well as crystalline and non-crystalline zeolites are disclosed. Zeolites tested included natural zeolites, chabazite and clinoptilolite and synthetic zeolites X, Y, F, J, M, Z, and A. Zeolite F was by far the most outstanding and zeolite A was substantially ineffective.

An article by C. Y. Chung et al from Nongsa Sihom Youngu Pogo 1978, 20 (Livestock) pp. 77-83 discusses the effects of cation exchange capacity and particle size of zeolites on the growth, feed efficiency and feed materials utilizability of broilers or broiling size chickens. Supplementing the feed of the broilers with naturally occurring zeolites, such as clinoptilolite, some increase in body weight gain was determined. Chung et al also reported that earlier results at the Livestock Experiment Station (1974, 1975, 1976—Suweon, Korea) showed that no significant difference was observed when 1.5, 3, and 4.5 percent zeolite was added to chicken layer diets.

A study by H. S. Nakaue of feeding White Leghorn layers clinoptilolite, reported in 1981 Poultry Science 60: 944-949, disclosed no significant differences in eggshell strength between hens receiving the zeolite in their diet and hens not receiving the zeolite in their diet.

In a recent study at the University of Georgia, both broilers and layers were fed small amounts (about 2%) of clinoptilolite, a naturally occurring zeolite from Tilden, Tex. The eggshells from the hens receiving zeolite were slightly more flexible as measured by deformation, slightly less strong as measured by Instron breaking strength, and had a slightly lower specific gravity. The differences in eggshell quality were very small. This type of zeolite was ineffective in producing a stronger eggshell. An article written by Larry Vest and John Shutze entitled "The Influence of Feeding Zeolites to Poultry Under Field Conditions" summarizing the studies was presented at Zeo-Agriculture '82.

It is therefore an important object of the present invention to provide an improved diet for animals for reducing heat stress in animals, wherein a small amount of zeolite is added to the feed directly fed to the animals during periods of temperatures sufficiently high to cause heat stress in the animals.

It is a principal object of the invention to provide a diet for poultry wherein a small amount of zeolite is added to the feed regularly fed to the poultry during heat stress causing temperatures without causing a deleterious effect on the poultry or poultry product.

Another object of the invention is to provide an improved process for decreasing heat stress in poultry laying hens wherein an effective amount of zeolite, especially zeolite A, is added to the feed fed to the poultry laying hens during heat stress causing temperatures.

Still another object of the invention is to cost effectively increase production of foods from animals or animal products during periods of heat stress causing temperatures.

Yet a further object of the present invention is to increase or maintain the level of the egg production of poultry laying hens during high summer temperatures.

Other objects and advantages of the invention will be more fully understood from a reading of the description and claims hereinafter.

SUMMARY OF THE INVENTION

The present invention relates to a method of decreasing heat stress in animals, i.e., reducing the deleterious effects of high temperatures on the animals, wherein a small amount of a zeolite is regularly fed to the animals during periods of heat stress causing temperatures and humidity.

DESCRIPTION OF THE PREFERRED EMBODIMENT

It has been discovered that the addition of a relatively small amount of zeolite to the diet of an animal during temperatures sufficient to cause heat stress in the animal will reduce such stress. Zeolite A is the preferred zeolite and is preferably added in amounts of from about 0.25 percent to about 4.00 percent of weight of the total feed weight.

A typical feed preparation for large scale laying hen operations comprises approximately the following by weight percent:

| | |
|---|---|
| Corn | 50–70 |
| Soybean Meal | 15–25 |
| Limestone | 5–9 |
| Alfalfa Meal | 1 |
| Phosphates | 0.8–2.0 |
| Vitamins, Amino Acids Salt and Other Minerals | 0.1–1 |

Zeolite A is added to such feed formulation in small amounts by weight percent of up to about four. Greater amounts may be used, but may deprive the layers of the desired amount of nutrients. Greater amounts are also likely to be cost ineffective. A preferred amount of zeolite A is from about one-half to about two percent by weight of the total feed formulation. A most preferred amount of zeolite A is about 0.75 to about 1.50 weight percent of the total feed formulation.

Using ETHACAL ™ feed component, a commercially available sodium zeolite A, a number of tests were conducted to determine the effect of zeolite on eggshell quality. ETHACAL ™ feed component has the following typical characteristics:

| | |
|---|---|
| Form | Free flowing powder |
| Color | White |
| Bulk Density, lb/ft$^3$ | 23–29 |
| Mean Particle Size, microns | 3.0 |
| Theoretical Ion Exchange Capacity, milliequivalents per gram (anhydrous) | 7.0 |

A typical chemical analysis is as follows:

| ELEMENT | % |
|---|---|
| Sodium (Na) | 12.6 |
| Aluminum (Al) | 14.8 |
| Silicon (Si) | 15.3 |
| Oxygen (O) | 35.1 |
| Water of hydration (H$_2$O) | 22.2 |
| Heavy Metals (Food Chemicals Codex Method) | less than 10 PPM |
| Lead (Food Chemicals Codes Method) | less than 10 PPM |

Heat stress trials were conducted at University houses under controlled conditions of temperature. The first trial was aborted when the temperature went out of control and caused high mortality.

A second trial was conducted with 84 birds. The birds were 68 week old commercial laying hens of the white leghorn breed. The birds were equally divided into two groups of 42 birds each. One group was fed a diet including zeolite A. The other group, the control group, was fed the same diet, but without any zeolite A. The group of birds fed zeolite A maintained production rate, shell quality and liveability when subjected to heat stress temperatures of 92°–94° F. for four weeks while the 42 control birds had reduced production rates, poorer shell quality and increased mortality. All three of the parameters were significantly different at a 95 percent confidence level.

During two days of the final week of a broiler chicken test conducted at another university, the temperature in the broiler experimental house rose above 98° F. Mortality among the broilers increased significantly during such two day period. After the data was analyzed, it was found that the mortality rate among the control birds was 2.5 times that of the birds being fed zeolite A in their diets. The following table summarizes the mortality.

| Weight Percent ETHACAL ™ Feed Component in Diet | Percent Mortality During Two Day High Heat Stress Period |
|---|---|
| 0 | 2.00 |
| 0.25 | 0.75 |
| 0.50 | 0.88 |
| 0.75 | 0.75 |

In another heat stress study, 168 birds (30 week old, young, mature laying hens) were divided into groups of 84 birds each, with one group being fed 1.5 weight percent ETHACAL ™ feed component in an environmentally controlled room in which daytime and nighttime temperatures were held at 95° F. and 85° F., respectively during weekdays and held at a constant 85° F. on weekends. The other group (control group) was similarly fed, but without any ETHACAL ™ feed component in the diet. The most dramatic result was the mortality difference. Thirty of the control birds died during the tests and only three of the ETHACAL ™ feed compnent fed birds died. There were also statistically significant improvements in egg production, in egg specific gravity, in egg size, and in body weight maintenance in the birds fed the ETHACAL ™ feed component.

Studies were conducted in environmentally controlled rooms in which the temperature was cycled between 95° F. (9 hours) and 85° F. (15 hours) daily, except on weekends the temperature was held at a constant 85° F.

The diet fed to the hens consisted principally of corn supplemented with a soybean meal (SBM) and limestone. It also contained smaller amounts of alfalfa meal, dicalcium phosphate (DiCalP), a synthetic amino acid (DL-methionine), salt, a commercial vitamin and mineral supplement for layers (Micro-Mix). Each diet assured that the hens received all of the required nutrients and minerals recommended by the Subcommittee on Poultry Nutrition of the National Research Council of the U.S.

The diets contained about 1,250 calories per pound, 16% crude protein, 0.55% total sulfur amino acids, 3.75% calcium and 0.65% total phosphorous.

TABLE A

Influence of ETHACAL ™ Feed Component on Egg Weight (g) & Specific Gravity[1] of 30-Week-Old White Leghorn-type Hens During Periods of High Ambient Temperatures[2]

| | Weeks | | | | | | | |
|---|---|---|---|---|---|---|---|---|
| | 1 | | 2 | | 3 | | 4 | |
| ETHACAL ™ (%) | Egg Weight (g) | Specific Gravity | Egg Weight (g) | Specific Gravity | Egg Weight (g) | Specific Gravity | Egg Weight (g) | Specific Gravity |
| 0 | 53.5$^a$ | 847$^a$ | 52.2$^a$ | 829$^b$ | 49.4$^b$ | 823$^b$ | 48.5$^b$ | 81.7$^b$ |

TABLE A-continued

Influence of ETHACAL ™ Feed Component on Egg Weight (g) & Specific Gravity[1] of 30-Week-Old White Leghorn-type Hens During Periods of High Ambient Temperatures[2]

| ETHACAL ™ (%) | Weeks | | | | | | | |
|---|---|---|---|---|---|---|---|---|
| | 1 | | 2 | | 3 | | 4 | |
| | Egg Weight (g) | Specific Gravity | Egg Weight (g) | Specific Gravity | Egg Weight (g) | Specific Gravity | Egg Weight (g) | Specific Gravity |
| 1.5 | 53.7[a] | 859[a] | 52.2[a] | 856[a] | 51.9[a] | 878[a] | 52.3[a] | 872[a] |

[1]Specific gravity = (tabular value × .0001) + 1.
[2]Temperatures set at 95° F. from 7:30–16:30 and 85° F. from 16:30–7:30 on weekdays and at a constant 85° F. on weekends.
[a,b]Means within a column with different superscripts are significantly different ($p < .05$).

TABLE B

Influence of ETHACAL ™ Feed Component on Body Weight (g) of 30-Week-Old White Leghorn-type Hens During Periods of High Ambient Temperatures[1]

| ETHACAL ™ (%) | Weeks | | | |
|---|---|---|---|---|
| | 1 | 2 | 3 | 4 |
| 0 | 1491 ± 19[a] | 1410 ± 14[a] | 1339 ± 16[b] | 1326 ± 20[b] |
| 1.5 | 1488 ± 17[a] | 1431 ± 14[a] | 1425 ± 15[a] | 1424 ± 15[a] |

[1]Temperature set at 95° F. from 7:30–16:30 and 85° F. from 16:30–7:30 on weekdays and at a constant 85° F. on weekends.
[a,b]Means within a column with different superscripts are significantly different ($p < .05$).

TABLE C

Influence of ETHACAL ™ Feed Component on Body Temperature (°C.) and Fecal Moisture (%) of 30-Week-Old White Leghorn-type Hens During Periods of High Ambient Temperatures[1]

| ETHACAL ™ (%) | Body Temperature (°C.) | Fecal Moisture (%) |
|---|---|---|
| 0 | 42.3[b] | 66.2[b] |
| 1.5 | 42.1[a] | 73.2[b] |

[1]Temperature set at 95° F. from 7:30–16:30 and 85° F. from 16:30–7:30 on weekdays and at a constant 85° F. on weekends.
[a,b]Means within a column with different superscripts are significantly different ($p < .01$).

TABLE D

Influence of ETHACAL ™ Feed Component on Mortality (%) of 30-Week-Old White Leghorn-type Hens During Periods of High Ambient Temperatures[1]

| ETHACAL ™ (%) | Weeks | | | | |
|---|---|---|---|---|---|
| | 1 | 2 | 3 | 4 | 1–4 |
| 0 | 1.2[a] | 0.0[a] | 17.9[b] | 16.7[b] | 35.7[b] |
| 1.5 | 1.2[a] | 1.2[a] | 0.0[a] | 1.2[a] | 3.6[a] |

[1]Temperature set at 95° F. from 7:30–16:30 and 85° F. from 16:30–7:30 on weekdays and at a constant 85° F. on weekends.
[a,b]Means within a column with different superscripts are significantly different ($p < .01$).

TABLE E

Influence of ETHACAL ™ Feed Component on Feed Consumption (g/b/d) of 30-Week-Old White Leghorn-type Hens During Periods of Hign Ambient Temperatures[1]

| ETHACAL ™ (%) | Weeks | | | |
|---|---|---|---|---|
| | 1 | 2 | 3 | 4 |
| 0 | 73.8[a] | 62.5[a] | 64.6[a] | 75.2[a] |
| 1.5 | 73.6[a] | 70.5[a] | 72.6[a] | 75.8[a] |

[1]Temperature set at 95° F. from 7:30–16:30 and 85° F. from 16:30–7:30 on weekdays and at a constant 85° F. on weekends.
[a,b]Means within a column with different superscripts are significantly different ($p < .01$).

TABLE F

Influence of ETHACAL ™ Feed Component on Egg Production (% HD) of 30-Week-Old White Leghorn-type Hens During Periods of High Ambient Temperatures[1]

| ETHACAL ™ (%) | Weeks | | | | |
|---|---|---|---|---|---|
| | 0 | 1 | 2 | 3 | 4 |
| 0 | 87.6 ± 2.2[a] | 82.8 ± 1.5[a] | 72.2 ± 1.4[b] | 41.1 ± 3.9[b] | 41.7 ± 1.5[b] |
| 1.5 | 84.8 ± 3.2[a] | 81.5 ± 1.9[a] | 80.0 ± 2.3[a] | 71.8 ± 2.3[a] | 74.7 ± 2.3[a] |

[1]Temperature set at 95° F. from 7:30–16:30 and 85° F. from 16:30–7:30 on weekdays and at a constant 85° F. on weekends.
[a,b]Means within a column with different superscripts are significantly different ($p < .05$).

The studies clearly show that zeolite A is effective in reducing heat stress in animals, especially poultry, both broiler and commercial egg laying types.

Animals include swine, bovines, ovines, and canines and any other animals affected by heat stress.

The term poultry as used herein includes all domestic fowl, namely chickens, turkeys, ducks, geese, and the like.

It can be appreciated that a wide variety of nutrients or foods may be included in the diets of animals. In a controlled environment, the animals are only exposed to desired foods or food products.

The composition of animal rations is obtained from or include many of the following ingredients:

Grain and processed grain by-products. Includes corn, corn hominy, corn germ meal, barley, millet, oats, rice, rice hulls, rye, sorghum, wheat and wheat shorts. These are among the energy ingredients, mostly carbohydrates with some proteins.

Plant protein products. Includes soybean oil meal, barley malt sprouts, coconut meal, corn distillers grain, corn gluten meal, cottonseed meal, pea seed, potato meal, peanut meal, rape seed meal, sunflower meal, wheat germ meal, brewers' yeast. All of these are principally protein sources.

Roughage or fiber. Includes dehydrated alfalfa, alfalfa hay, alfalfa leaf meal and pasture grasses. These are all fiber-rich sources.

Animal and fish by-products. Includes blood meal, blood flour, dried buttermilk, dried whey, dried casein, fish meal, dried fish solubles, liver meal, meat meal, meat meal tankage, feather meal, bone meal and dried skim milk. Anchovies, herring and menhaden are sources of fish meal.

Minerals and synthetic trace ingredients. Includes vitamins such as B-12, A, pantothenate, niacin, riboflavin, K, etc., DL methionine, choline chloride, folic acid, dicalcium phosphate, magnesium sulfonate, potassium sulfate, calcium carbonate (limestone, oyster shells), salt, sodium selenite, manganous oxide, clacium iodate, copper oxide, zinc oxide and D activated animal sterol.

Molasses and animal fats are added to improve palatability and to increase or balance the energy levels.

Preservatives are also added such as, Ethoxyquin TM and sodium sulfite.

The foregoing disclosure and description of the invention is illustrative and explanatory thereof and various changes in the illustrated process may be made within the scope of the appended claims without departing from the spirit of the invention.

What is claimed is:

1. A method of reducing heat stress in an animal subjected to a period of heat stress causing temperature, said method comprising adding zeolite A to the diet of said animal and feeding said animal during said period, a small amount of zeolite A added to said which effectively reduces said heat stress.

2. The method of claim 1 wherein said heat stress causing temperature is at least 85° F.

3. The method of claim 2 wherein the amount of zeolite added to said diet is from about 0.25 to about 4.00 weight percent.

4. The method of claim 3 wherein said animal is selected from the group consisting of poultry, swine, and canines.

5. The method of claim 4 wherein said animal is poultry.

6. The method of reducing heat stress in poultry subjected to a period of heat stress causing temperature, said method comprising feeding, to said poultry during said period, a small but effective amount of zeolite A added to the diet of said poultry.

7. The method of claim 6, wherein the amount of zeolite A added is an effective amount up to about 4 weight percent of the feed.

8. The method of claim 6, wherein the amount of zeolite added to the feed is from about 0.25 percent to three percent by weight.

9. The method of claim 6, wherein the amount of zeolite added to the feed is about 0.75 weight percent.

10. The method of claim 6, wherein the amount of zeolite added to the feed is about 1.5 weight percent.

11. The method of claim 6 wherein said heat stress causing temperature is at least 85° F.

12. A method of reducing heat stress in poultry without causing any deleterious effects to said poultry or to poultry products produced therefrom, said method comprising feeding a small, effective amount of zeolite A of up to about four weight percent of the feed to said poultry during a period that said poultry is exposed to heat stress causing temperature.

13. The method of claim 12, wherein the heat stress causing temperatures are at least 85° F.

14. The method of claim 12, wherein the zeolite A is a sodium zeolite A.

15. The method of claim 12, wherein the zeolite A is in an amount of about 0.25 to about three percent by weight of the feed.

16. The method of claim 15, wherein the zeolite A is in an amount of about 0.75 percent by weight of the feed.

17. The method of claim 15, wherein the zeolite A is in an amount of about 1.5 percent by weight of the feed.

18. A method of reducing heat stress in poultry, said method comprising exposing said poultry to a temperature condition sufficient to induce heat stress in said poultry, while feeding said poultry a poultry feed comprising from about 0.25 to about 4.0 weight percent of zeolite A.

19. The method of claim 18 wherein said poultry is housed in structures for raising said poultry.

20. The method of claim 19 wherein said poultry are laying hens.

21. The method of claim 19 wherein said poultry are broilers.

22. The method of claim 21 wherein said broilers have decreased mortality.

* * * * *

UNITED STATES PATENT AND TRADEMARK OFFICE
CERTIFICATE OF CORRECTION

PATENT NO. : 4,759,932

DATED : July 26, 1988

INVENTOR(S) : Sebastian M. Laurent et al.

It is certified that error appears in the above-identified patent and that said Letters Patent is hereby corrected as shown below:

Column 8, line 34, reads "compnent" and should read -- component --.

Column 8, Table A, (last line of column) the right-hand entry reads "$81.7^b$" and should read -- $817^b$ --.

Column 11, line 1, reads "clacium" and should read -- calcium --.

Column 11, line 18, reads "to said which" and should read -- to said diet which --.

Signed and Sealed this

Third Day of January, 1989

*Attest:*

DONALD J. QUIGG

*Attesting Officer*     *Commissioner of Patents and Trademarks*